United States Patent
Finch et al.

(10) Patent No.: US 6,704,802 B1
(45) Date of Patent: *Mar. 9, 2004

(54) METHOD AND SYSTEM FOR COMMUNICATING BETWEEN INDEPENDENT SOFTWARE MODULES

(75) Inventors: Richard W. Finch, Austin, TX (US); Roderick W. Stone, Austin, TX (US)

(73) Assignee: Dell USA, LP, Round Rock, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1468 days.

(21) Appl. No.: 08/622,806

(22) Filed: Mar. 27, 1996

(51) Int. Cl.$^7$ ................................. G06F 9/44
(52) U.S. Cl. ........................................ 709/315
(58) Field of Search ................. 395/683, 685, 395/614, 800, 183.14, 670; 204/315

(56) References Cited

U.S. PATENT DOCUMENTS

| | | | | |
|---|---|---|---|---|
| 5,175,854 A | * | 12/1992 | Cheung et al. | 395/670 |
| 5,327,562 A | * | 7/1994 | Adcock | 395/683 |
| 5,371,891 A | * | 12/1994 | Gray et al. | 395/683 |
| 5,442,793 A | * | 8/1995 | Christian et al. | 395/683 |
| 5,546,595 A | * | 8/1996 | Norman et al. | 395/800 |
| 5,564,048 A | * | 10/1996 | Eick et al. | 395/614 |
| 5,606,661 A | * | 2/1997 | Wear et al. | 395/183.14 |
| 5,615,333 A | * | 3/1997 | Juettner et al. | 395/183.14 |
| 5,615,400 A | * | 3/1997 | Cowsar et al. | 395/685 |

OTHER PUBLICATIONS

Duntemann, Jeff; Poly want an object?; Dr. Dobb's Journal, v14, n11 p142(12), Nov. 1989.*

Saks, Dan; How virtual functions work; C Users Journal, v12, n1, p61(9), Jan. 1994.*

Ellis et al, The Annotated C++ Reference Manual, Chaps 10–12 pp. 195–306, 1990.*

* cited by examiner

*Primary Examiner*—John Follansbee
(74) *Attorney, Agent, or Firm*—Haynes and Boone, LLP

(57) ABSTRACT

A software system uses virtual functions to control communication between independent software modules configured in an architecture which includes a parent process and one or more independent child processes. Communication is established by the parent process which creates, loads and unloads both a child process and an object that describes the functions that are accessed by the child process. The parent process creates and loads the child process, then passes a pointer which designates the object to the child process. The child process completes a communication path by creating an object and granting access to the object to the parent process by passing a pointer designating the object to the parent process. A child process is associated to both objects created by the child process and to a virtual table of pointers which designate the objects. The parent process controls memory allocation so that the child process can be unloaded from memory while the objects created by the child process and the virtual table associated to the child process are retained. In this manner, a software module is implemented as a loadable child process which is independent from other software modules.

26 Claims, 6 Drawing Sheets

METHOD AND SYSTEM FOR COMMUNICATING BETWEEN INDEPENDENT SOFTWARE MODULES

BACKGROUND OF THE INVENTION

1. Field of the Invention

The present invention relates to operating systems within a computer. More specifically, the present invention relates to a software system in an object-oriented environment for communicating between independent software modules including temporarily-loadable software modules.

2. Description of the Related Art

Software programs are progressively increasing in size and complexity. Accordingly, software systems have evolved into highly complex structures, having applications that exhibit a rich and diverse set of behaviors. For such systems, an individual software developer has great difficulty understanding all subtleties of the system design. Software complexity arises inherently due to the complex problems that software is designed to address, the design flexibility intrinsic to software, the difficulty in managing a software development process and the problems of characterizing the behaviors of a discrete system.

What is needed are disciplined techniques for mastering this complexity.

In addition, this complexity is elevated by the complication that the requirements of a software system often change during development, typically because the very existence of the development project changes the scope of the problems originally addressed. Display and usage of early design products, such as design documents and prototypes, followed by usage of early operational system models, allows system users to understand and articulate the real needs to be addressed by the system. Critical feedback from the users to developers allows the developers to further understand the desired behaviors of the system.

In this manner, a software system becomes an evolving creation, conforming to the changing needs of users. Typically, other system components, such as the hardware systems upon which the software operates, are also evolving so that the software further evolves to adapt to the changing components.

To address the complexity and evolutionary nature of a software system, the system is best addressed as a hierarchic structure having multiple collaborating component parts.

What is further needed is a capability to apportion a software system into these collaborating components and logically organize these components so that multiple programmers can work on the software system at one time. By apportioning the software system into modules, problems of code and data sharing between the modules arises. As software systems continue to increase in complexity, techniques are needed to establish various system characteristics, such as software reliability and maintainability. An extensible system is advantageous to address the evolving nature of system capabilities, both in software and hardware components. A system having independence of modules advantageously promotes reliability, maintainability and extensibility. System efficiency is promoted by program code reuse, data sharing, dynamic loading and unloading of modules, persistent data, and bidirectional communication between system components such as between a parent process and a module.

Various conventional techniques have been attempted to address the problems that arise in complex software systems. These conventional techniques include usage of overlays and, in some environments, dynamic-link libraries (DLL). Neither of these techniques fully addresses the problems arising from software complexity.

The usage of overlays has several shortcomings. An overlay is a portion of a program that is called into memory as needed, overlaying a previous redundant section of the program. Overlays allow usage of programs that are larger than the memory capacity of a computer. When overlays are employed, all components of the program must be run through a linking process to resolve references so that all portions of the program must be present in the computer system at one time during the build process. If separate portions are developed in physically different locations, object modules corresponding to the separate portions must be shipped to a particular location for linking with other modules. Furthermore, some portions of the program may be developed at different times. When a new module is added to the program or if any portion of the program changes, all modules must be relinked. In addition, to maintain coherence between the data structures in the various modules, some modules must be modified to maintain compatibility with other modules. Furthermore, an overlay cannot save data between the different times that the overlay is loaded without resorting to error-prone and hard-to-support techniques.

The dynamic-link library (DLL) approach also has substantial disadvantages. A dynamic-link library is a library of shared functions to which applications link at runtime, as opposed to compile time. A single in-memory copy of the DLL satisfies requests from all calling applications. For example, the DLL technique does not allow for bi-directional communications as the DLL only responds to calls from a calling application. The DLL cannot originate a call to an application. In addition, once the DLL is loaded, the DLL usually remains loaded and therefore occupies valuable memory space. A DLL can allocate memory but cannot automatically reconnect to the allocated memory the next time the DLL is loaded.

SUMMARY OF THE INVENTION

In accordance with the present invention, a software system uses virtual functions to control communication between independent software modules configured in an architecture which includes a parent process and one or more independent child processes. Communication is established by the parent process which creates, loads and unloads both a child process and an object that describes the functions that are accessed by the child process. The parent process creates and loads the child process, then passes a pointer which designates the object to the child process. The child process completes a communication path by creating an object and granting access to the object to the parent process by passing a pointer designating the object to the parent process. A child process is associated to both the object created by the parent process and the object created by the child process and to a virtual table of pointers in each of the objects which designate the objects. The parent process controls memory allocation so that the child process can be unloaded from memory while the objects created by the child process and the virtual table associated to the child process are retained. In this manner, a software module is implemented as a loadable child process which is independent from other software modules.

In accordance with one embodiment of the invention, a method of communicating among independent software modules includes the steps of loading a parent process and, through a generating operation of the parent process, generating a child process. The parent process, through a creating operation, then creates a first object describing a first function that is accessible to the child process and loads, through a loading operation, the child process into a storage. The parent process passes a first pointer which designates a first object to the child process. The child process includes a creating operation that creates a second object that describes a second function that is accessible to the parent process. The child process, using a CALL function, passes a second pointer designating the second object to the parent process.

In accordance with another embodiment of the invention, a computer system has a storage and includes one or more interface modules, one or more system modules, one or more device modules and an application programming interface (API) connected to the one or more interface modules, the one or more system modules and one or more device modules. The API has a parent process which includes a constructor function for creating processes, objects and pointers, a loader function for loading processes and objects from the storage, and an unloader function for unloading processes and objects from the storage. A module of the interface, system and device modules has a child process which is created and loaded into storage by the parent process and includes a constructor function for creating objects and pointers. The API and the module form a virtual function interface which includes a first object created by the parent process and describing a function that is accessible to the child process, a first pointer created by the parent process and passed by the parent process to the child process, the first pointer designating the first object to the child process, a second object created by the child process and designating a second function that is accessible to the parent process, and a second pointer created by the child process and designating the second object, the second pointer being passed from the child process to the parent process.

Many advantages are achieved by the described method and system. One advantage is that software modules are independent so that a module having a pointer to an object of a particular class has access to the functions within that class without having to be physically linked with the module that contains the implementation of the class. Another advantage is that communication is established between independent modules despite neither a parent process nor a child process having any program code made accessible by linking of the other module's class implementation. One advantage of independent software modules is that multiple modules may be developed simultaneously with distributed and independent design and development. Maintenance is reduced by isolating software changes to a single independent module which eliminates updating of other modules. Testing is simplified since each module may be tested independently of other modules. Independence among modules improves reliability by avoiding unexpected interactions between functions of different modules. Another advantage is that software system is easily extensible. Code reuse is advantageously promoted using the virtual table technique. A further advantage is that the system uses virtual function features that resolve addresses of functions at run time rather than at link time so that the software system is freely configurable to furnish a versatile functionality.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE PREFERRED EMBODIMENTS

Figure 1:
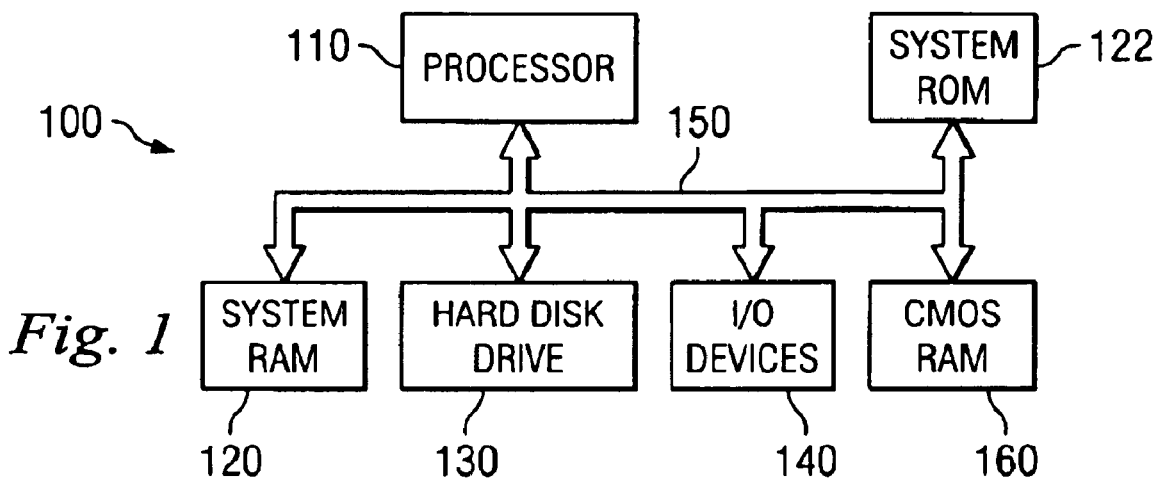
FIG. 1 is a block diagram which depicts computer system hardware upon which a software system for communicating between independent software modules in accordance with an embodiment of the present invention is implemented.

Referring to FIG. 1, a computer system 100 is shown which runs a system for creating an operating system independent environment for executing utility programs. The computer system 100, typically a personal computer, includes a processor 110, a system random access memory (RAM) 120, a system ROM 122, a hard disk drive 130 and various other input/output devices 140. These system components communicate via a bus 150 which includes data, address and control lines. A CMOS clock nonvolatile RAM 160, which is connected to the processor 110 via the bus 150, is typically utilized to store information even when power to the computer system 100 is interrupted. Program instructions that make up the system for creating an operating system independent environment are stored in a storage device such as the hard disk drive 130 or the system ROM 122 connected to the processor 110. The processor 110, for example an x86 processor such as a 486, Pentium™ or Pentium Pro™ processor, executes the computing operations of the computer system 100.

Figure 2:
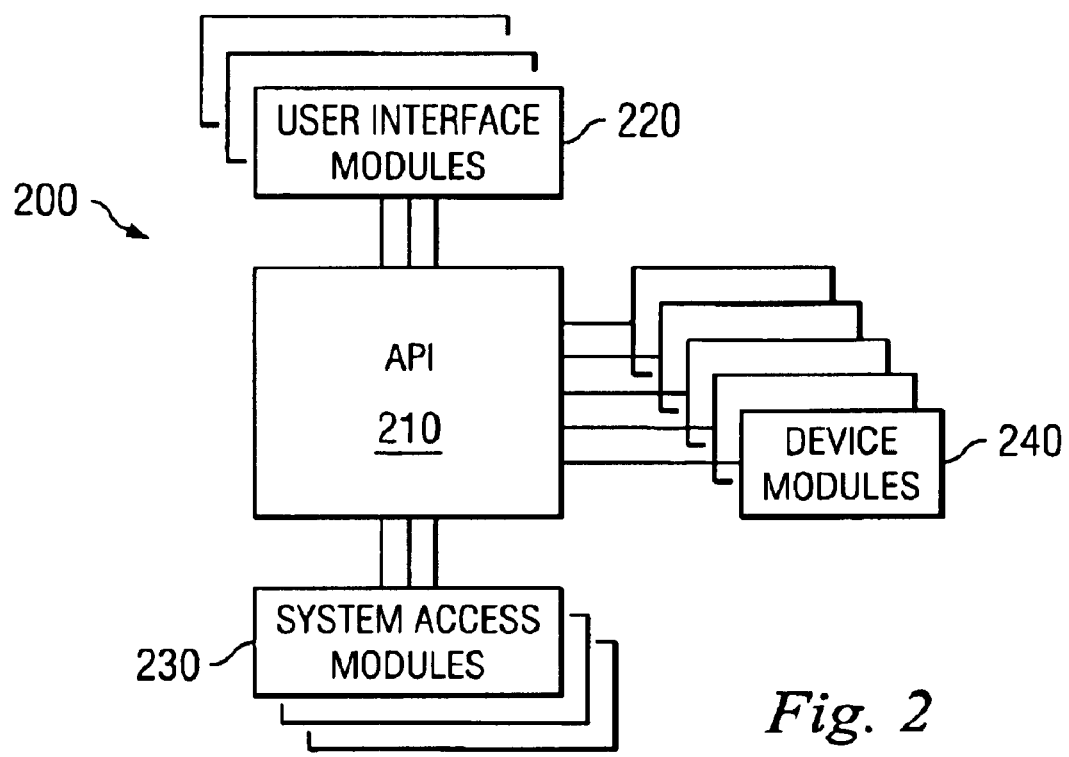
FIG. 2 is a block diagram which shows a software system for communicating between independent software modules in accordance with an embodiment of the present invention.

Referring to FIG. 2, a block diagram shows a software system 200 for communicating between independent software modules. The software system 200 typically includes a controlling application programming interface (API) 210, a plurality of user interface modules 220, a plurality of system access modules 230 and a plurality of device modules 240. In various embodiments, the software system 200 may include one or several of the user interface modules 220, a plurality of system access modules 230 and a plurality of device modules 240, or may not include any of one or more of the particular module types. The controlling API 210 includes a defined set of functions that are furnished by the software system 200 or used by an application. A user interface module 220 includes interface software for communicating information between the controlling API 210 and a system user. A system access module 230 is a hardware-level system-specific hardware device driver software module. A device module 240 is a hardware-level geriatric-type hardware device driver software module.

Figure 3:
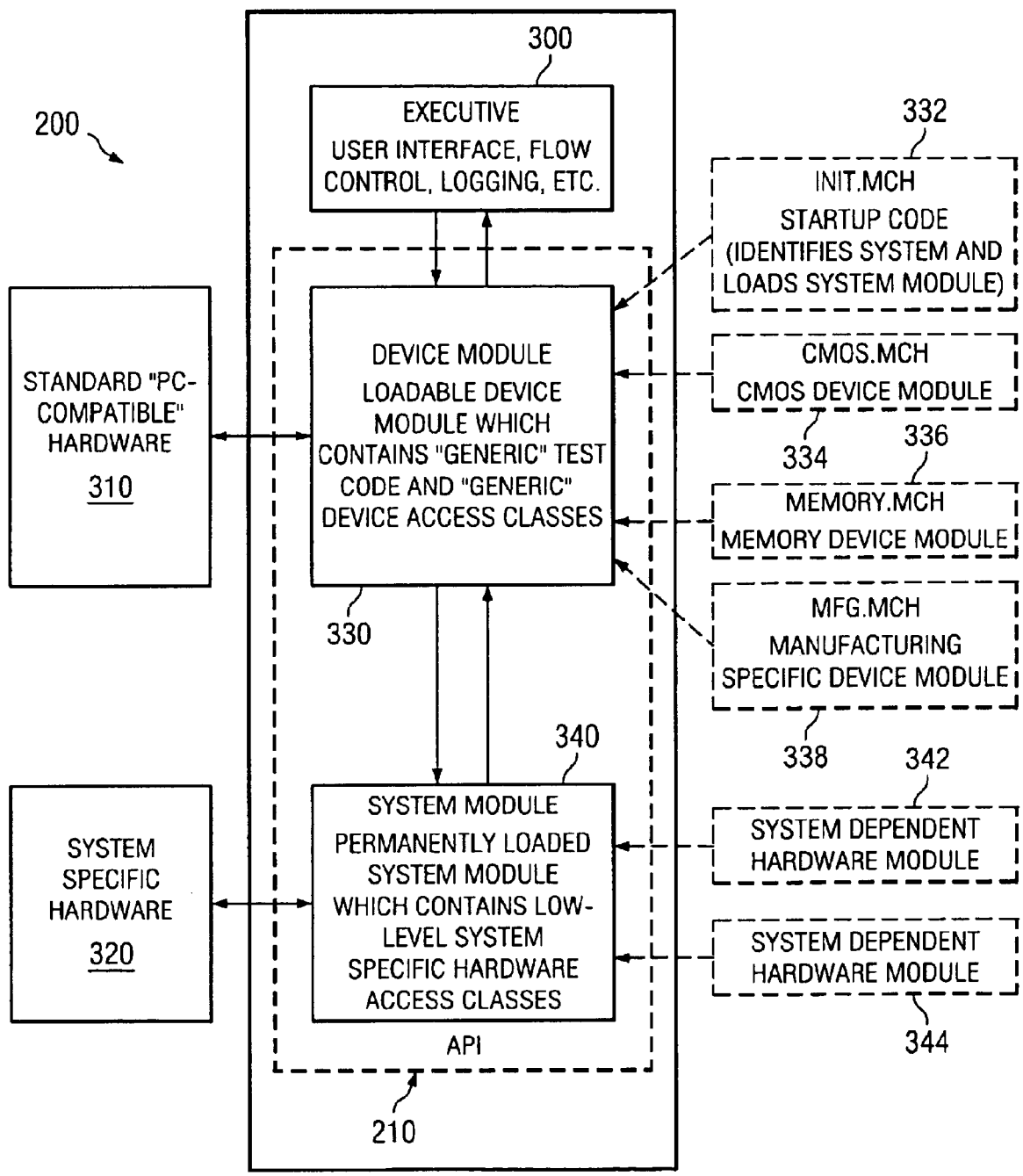
FIG. 3 is a block diagram which depicts the software system and interconnections with computer system hardware.

Referring to FIG. 3, a block diagram shows the software system 200 interconnections with computer system hardware. In particular, the software system 200 includes an interface to one or more hardware components in the groups of standard "PC-compatible" hardware 310 and system-specific hardware 320. The software system 200 includes an executive 300, a master software program that controls the execution of other software modules in the controlling API 210. The controlling API 210 includes device modules 330 and system modules 340. The executive 300 is a software program that controls various functions such as user interface control, flow control, data logging and the like.

The device modules 330 are loadable device modules that contain generic-type test programs and generic-type device access classes. Examples of device modules 330 are an initialization module 332 using initialization program code for identifying a software system and loading a system software module and a CMOS device module 334 for controlling a CMOS memory holding system configuration information in nonvolatile memory. Other examples of device modules 330 are a memory module 336 for controlling a memory device and a hardware specific module 338 for controlling a manufacturing-specific device. The device modules 330 are connected to standard "PC-compatible" hardware 310.

Each device module 330 includes one instance of a device module structure. The device module structure includes a signature, a pointer to a startup code for the module, a pointer to an initialization function of the module, and a pointer to an exit function of the module, all of which are statically initialized at link time. The device module structure also includes a pointer to a module function for setting global flags, and a pointer to an executive base class object in the executive. The device module structure also includes an API version number, an index into a file table for the module, an initial value of the stack segment of the module, an initial value of the module stack pointer and a value of the stack limit of the executive. The API 210 loads the device module 330 into a storage, such as a memory, and locates the device module structure by scanning for the signature at the beginning of the device module structure. Once the device module structure is located, the API 210 initializes the pointer to the executive base class object in the executive 300 to point to the single instance of the executive class. Next, the API 210 initializes the index into the file table for the device module 330 to indicate the file table element associated with the device module 330. The API 210 initializes the stack segment and stack pointer to initial values that enable the "main" function of the device module 330 to return to the API 210 and then executes the startup code in the device module 330 using the initialized startup pointer in the device module structure. The API 210 then calls the module initialization function using the pointer to the device module initialization function, enabling the device module 330 to detect any devices supported by the device module 330 and instantiate device class objects for the devices. The API 210 calls the module exit function each time the device module 330 is to be unloaded from memory so that various miscellaneous cleanup operations are performed. Cleanup operations include closing of files, flushing of buffers and the like. The device module exit function executes exit code and returns control to the API 210.

The system modules 340 are permanently loaded device modules that contain hardware-level system-specific hardware access classes. A system module is loaded using a system module loading function that loads a specified system module file into memory. A system module file is a module containing system-specific access classes and is loaded into memory where the file remains resident. Device modules 330 access the system specific access classes via the API 210. The system module loading function first finds the specified system module file, calculates the amount of memory capacity to load the module file, and calculates the load size for the file. The loading function allocates memory for loading the system module, sets up a far pointer to a parameter block that is accessed by the system module, and loads the module into memory. In one embodiment, the module is loaded into memory by executing an int 21h DOS function. The loading function checks the loaded system module for the existence and validity of various data structures such as an ID string, API version number, and various suitable data and information pointers. The system module loading function also initializes and sets various control parameters including local variables set to member variables and setting of local variables to stack segment and stack pointer elements. The loading function save the stack segment and stack pointer of the executive on the module stack and restores registers.

Examples of system modules 340 are various system-dependent hardware modules 342 and 344. The system modules 340 are connected to system-specific hardware 320.

Each system module 340 includes one instance of a system module structure. The system module structure includes a signature, a pointer to a startup code for the system module, a pointer to an initialization function of the system module, and a pointer to an exit function of the system module, all of which are statically initialized at link time. The system module structure also includes a pointer to a module function for setting global flags, and a pointer to an executive base class object in the executive. The system module structure also includes an API version number, an index into a file table for the module, an initial value of the stack segment of the system module, an initial value of the system module stack pointer and a value of the stack limit of the executive. The API 210 loads the system module 340 into memory and locates the system module structure by scanning for the signature at the beginning of the system module structure. Once the system module structure is located, the API 210 initializes the pointer to the executive base class object in the executive 300 to point to the single instance of the executive class. Next, the API 210 initializes the stack segment and stack pointer to initial values that enable the "main" function of the system module 340 to return to the API 210 and then executes the startup code in the system module 340 using the initialized startup pointer in the system module structure. The API 210 then calls the module initialization function using the pointer to the system module initialization function. The API 210 calls the module exit function each time the system module 340 is to be unloaded from memory so that various miscellaneous cleanup operations are performed. Cleanup operations include closing of files, flushing of buffers and the like. The system module exit function executes exit code and returns control to the API 210.

Figure 4:
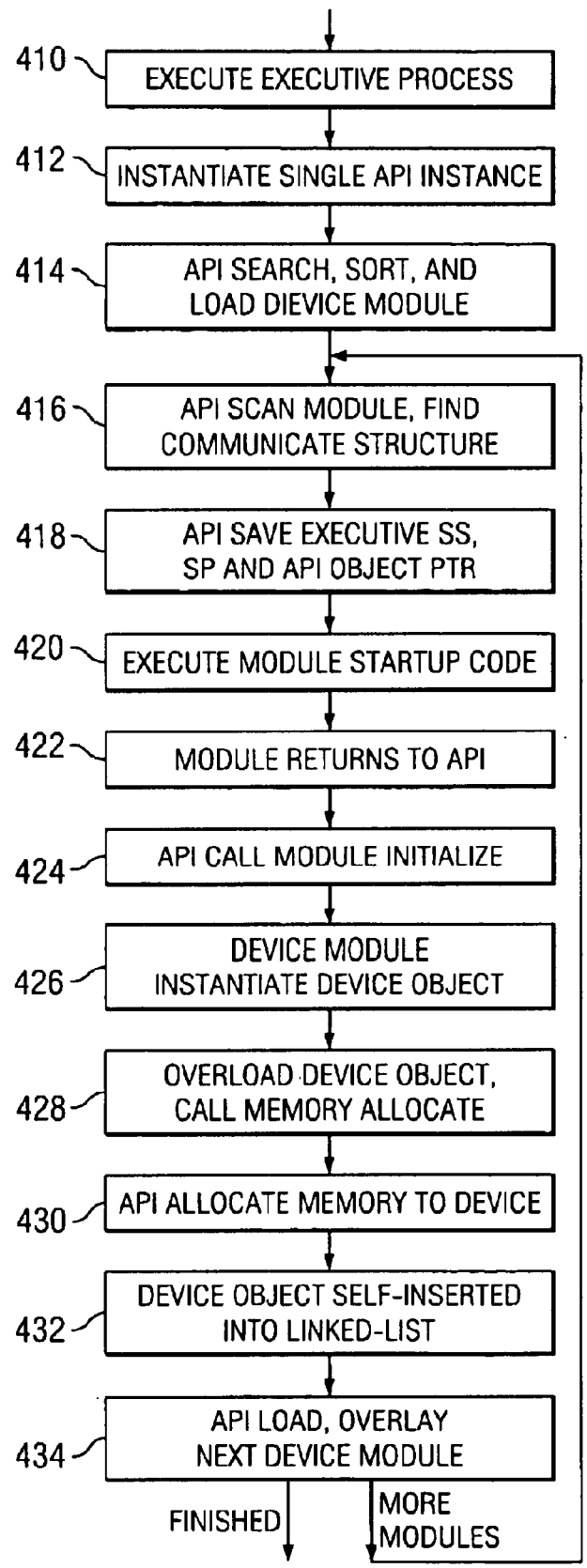
FIG. 4 is a flowchart which illustrates operations of the software system including operations that allocate classes and objects to modules and blocks within the physical design of the software system.

Referring to FIG. 4 in conjunction with FIG. 3, a flowchart illustrates operations of the software system 200 including operations that allocate classes and objects to modules and blocks within the physical design of the software system 200. In step 410, the software system 200 executes the executive 300. The executive 300, in step 412, operates on the controlling API 210 to instantiate a single instance of the API class. The executive 300 performs the instantiation function by writing information in a template of a generic or parameterized class, here the API class, to produce the API class from which instances are created. The controlling API 210 performs an API constructor operation. A constructor is an operation that creates an object, initializes the state of an object or both creates and initializes the object.

In step 414, the API constructor searches for all device modules, sorts the device modules, and then loads the first device module. The API constructor conducts the search for device modules using a dynamically-selected file mask to identify the files to be included in the search. The API constructor sorts a table of device module files prior to loading and initialization of the files. The API constructor sorts the list of files based on an overlay number of the files which is stored in an EXE header of a module and is initialized at make time. Using this technique, the order of loading the device module files is controlled. The API constructor allocates and initializes an array of file table structures with the file names and load sizes of all device modules that are found. The API constructor then loads each device module file and calls a device initialization function in the module. At the completion of the API constructor operation, a sorted linked list of all devices found by the API constructor exists in memory and is designated by a "first device" data pointer of an executive base class object. Typically, the searching, sorting and loading operations are achieved using any method or operating system function that allows far call operations. These methods and operating system functions are known in the computer software arts. One example of such a method or operating system function is an Execute Program (EXEC) DOS Interrupt 21h function 4Bh, subfunction 3, which uses the DOS overlay function to load a specified module file into memory.

In step 416, the API constructor operation of the controlling API 210 scans the first device module to find a communication structure. The communication structure is identified by a unique signature and checksum, which are previously set to predetermined values. In step 418, the API constructor operation of the controlling API 210 accesses the stack segment and pointer of the executive 300 and accesses a pointer to the API class object. The API construction operation then saves the stack segment and pointer of the executive 300 and the API class object pointer to the communication structure of the first device module. In different embodiments of the software system 200, various techniques are used to save stack pointers and furnish a pointer to a module. These techniques include usage of command line parameters, environmental variables, interrupt handlers and the like. These techniques are known in the computing arts.

In step 420, the API constructor executes the startup code of the device module. The startup code of the device module calls the main function of the device module in step 422. The device module main function returns to the API constructor using the stack segment and the pointer that were stored in the communication structure of the device module in step 418. The controlling API 210 then, in step 424, calls the initialization function of the device module using the pointer stored in the communication structure of the device module. The initiated device module produces a class, or class operator, from which further instances are created.

In step 426, the initialization function of the device module uses the class operator to instantiate a device class object. In step 428, the class operator for the device class is overloaded so that the class operator and other class operators in the device class have corresponding values and variables in accordance with the object programming concept of polymorphism. Thus, the various class operators in the device class may declare procedures and functions having the same names so long as the invocation of such procedures and functions are distinguishable by their corresponding parametric profiles, including the numbers and types of arguments and the types of values returned by the procedures and functions. In combination with overloading of the class operator, the class operator calls a memory allocation function in the controlling API 210 using the API class object pointer that is stored in the communications structure of the device module in step 418.

An API allocation function of the controlling API 210 allocates memory for the device object in step 430 and returns a pointer designating the allocated memory to the device module. In step 432, a device constructor of the device object inserts itself into a linked list of device objects belonging to the API class object. In step 434, the API constructor loads a next module, overlaying the current module in memory and branches to step 416 to repeat all of steps 416 through 432 for all modules.

When all modules are loaded and have instantiated device class objects, the API 210 includes a pointer to a linked list of all device class objects. The pointer and linked list establish a method for bidirectional communication between independent modules. This pointer empowers the API 210 to directly call any virtual member function of the device class simply by using a conventional function call so long as the module corresponding to the device object is reloaded into memory at the same location that the particular device object was originally loaded in step 414. In turn, the device module now has access to a pointer to the API class object, as stored in the communication structure in step 418. This pointer to the API class object enables a device module to directly call any virtual member function of the API class using a conventional function call. The API 210 and the device modules 330 are not mutually linked and may be created at different times. The communication between independent modules is established by compilation of both the API 210 and the device modules 330 with a header that defines the device and API classes.

The software system 200, in addition to having constructor functions for constructing devices, also includes a class destructor function that frees memory for all device names and device type names. The class destructor also frees memory for all device class objects, frees memory that is allocated by a module that is currently in memory, frees module memory and the file table and returns from execution.

Figure 5A:
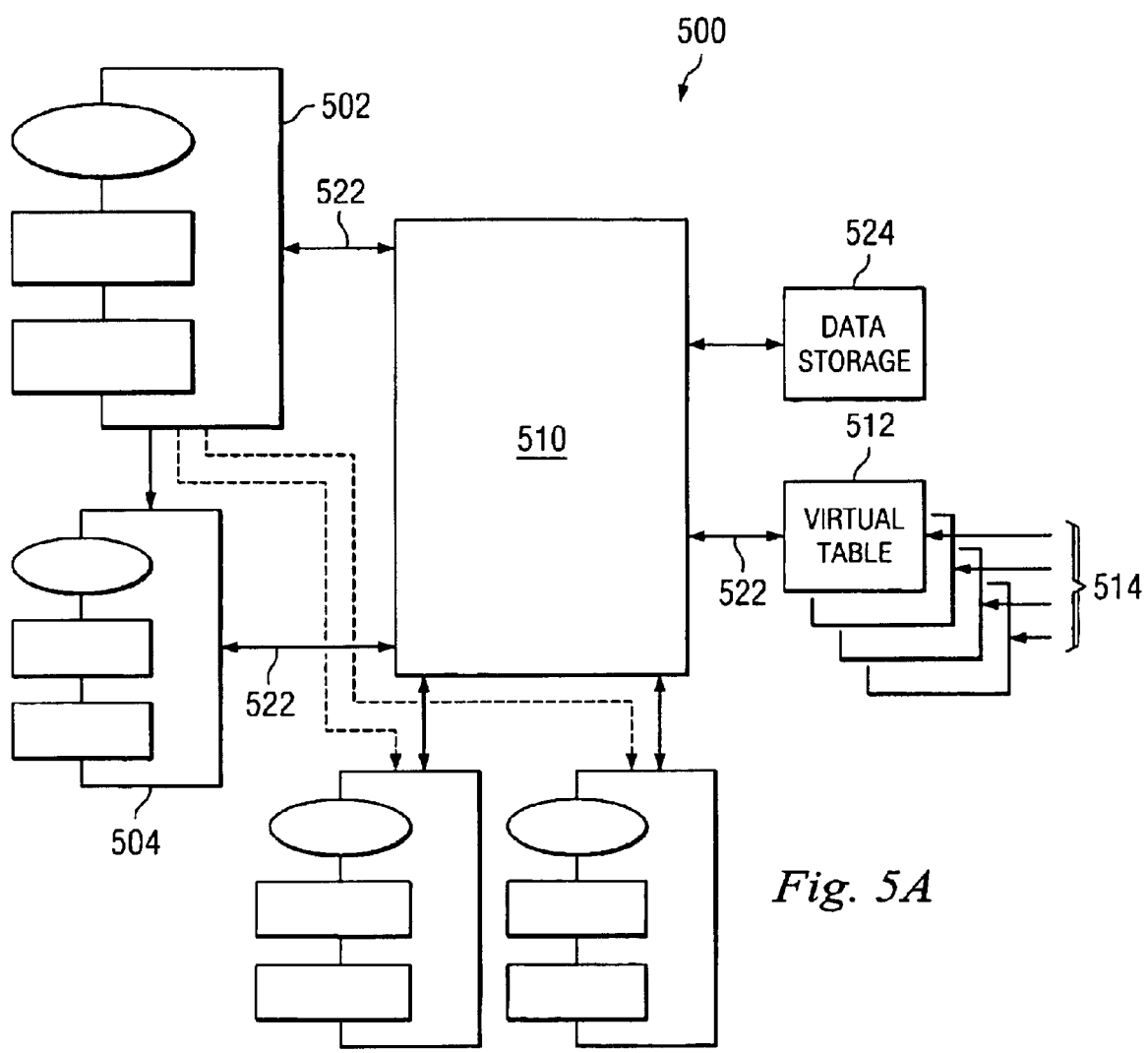
FIGS. 5A and 5B are, respectively, a module diagram and a class hierarchy diagram which illustrate the physical structure of the software system including a plurality of independent modules arranged in a hierarchy which includes one or more parent processes.

Referring to FIG. 5A, a module diagram illustrates the physical structure of the software system 200 including a plurality of independent modules 500 arranged in a hierarchy which includes one or more parent processes, although the illustrative software system 200 includes only a single parent process 502 and one or more child processes 504. A module is a unit of program code that serves as a building block for the physical structure of a system. A module contains declarations that form a physical realization of some or all of the classes and objects included in the logical design of the system. In a parent/child relationship, information is passed from one generation to the next. In particular, the parent process 502 operates on older information to create new information operated on by a child process 504. The modules 500 mutually interact through an interface 510 that is created in an object-oriented language, such as C++. In one embodiment, each individual module includes a C++ interface, although other portions of the module may be developed in other languages, such as assembler, C, Pascal and the like. All modules 500 are independent as each individual module is independently operable, nor requiring the linking of any other module to be functional in the software system 200.

The parent process 502 performs basic operations including loading and unloading one or more child processes 504 and initiating communication between loaded child processes 504 including setting up communication structures. Child processes 504 create objects that are used for data storage and complete the communication structure. A function of a process that creates an object is termed a "constructor". This communication structure achieves bidirectional communication between parent process 502 and child processes 504 using object-oriented language constructs, such as an adaptation of C++ virtual language features. The virtual function features advantageously resolve addresses of functions at run time rather than at link time so that the software system 200 is freely configurable to furnish a versatile functionality. In a system that does not incorporate virtual functions, a compiler generates a name reference for a particular external function that is resolved at link time by necessarily linking software modules with the particular software module that implements the named external function. In contrast, a system that utilizes virtual functions implements each virtual function by designating a position in a table to that function. During compilation of the software system 200 which utilizes virtual functions, when a virtual function that is part of a particular defined class is encountered, a compiler (not shown) inserts a code that references an offset into a virtual table 512. The virtual table 512 establishes the communication structure, rather than designating a particular actual function name. When an object that contains a virtual function is created, the compiler inserts a program code which constructs the virtual table 512 into a module 500, thereby implementing the particular virtual function. One virtual table 512 is constructed for each defined class.

In the software system 200, the interface 510 operates through the virtual table 512 for each class. The virtual table 512 is a simple list of pointers, each pointing to a particular virtual function. All objects of a defined class share the same virtual table 512 so that the compiler establishes only a single link between each additional object and the virtual table 512. Using this technique, a module having a pointer to an object of a particular class advantageously has access to the functions within that class without having to be physically linked with the module that contains the implementation of the class.

Virtual functions are conventionally used to implement polymorphism, a concept by which a message is interpreted differently when received by different objects so that the similar objects respond differently to the same message. The polymorphism concept is typically used by a class that is derived from a parent class to override functions that exist in the parent class.

In the present software system 200, the concept of polymorphism is modified to facilitate communication between software modules by supplying the interface 510 between the parent process 502 and a child process 504. Communication between modules 500 is established using a constructor function of the parent process 502 to create an object that describes the functions that any child process 504 can access. The parent process 502 associates the created object to the child process 504 by passing a pointer 514 designating the object to the child process 504. The child process 504 thus gains the ability to access functions in the parent process 502 by using the virtual table 512. A constructor function of the child process 504 completes a communication path 522 by creating an object of an appropriate class and calling back into the parent process 502 to pass the pointer 514 to the object. Once the communication path 522 is completed, the parent process 502 has access to the functions in the child process 504 using the virtual function concept via the virtual table 512. In this manner communication is advantageously established between independent modules despite neither the parent process 502 nor the child process 504 having any program code made accessible by linking of the other module's class implementation.

As the software system 200 operates over time, the parent process 502 loads and unloads a child process 504 as needed. The parent process 502 controls allocation of memory in the processor so that the parent process 502 can retain objects and virtual tables 512 associated with the objects 504 while discarding the child process 504 which contains the implementation of the classes. The objects and virtual tables 512 that persist despite the discarding of the child process 504 that created the objects and virtual tables 512 are said to have the property of persistence. Persistence is the property of an object by which the existence of the object transcends the existence of the process which creates the object. Thus a persistent object persists even though the creator, the child process 504 which created the object, ceases to exist. The child process 504 functions contain the implementation of the child's classes. When the parent process 502 subsequently is to access a function of the child process 504, the parent process 502 simply reloads the child process 504 program code that contains the function. The child process 504 is reloaded into the same locations in memory as originally loaded since the virtual table 512 that is part of the class object contains pointers into the child module 504. Various object-oriented language systems use different techniques, as are known in the computing arts, for reloading a child module into the memory location at the position of initial loading.

The software system 200 creates persistent and sharable data storage 524 for a child process 504 simply by adding data elements to the class object that describes the virtual functions belonging to the child process 504. The object is made persistent by having the child process 504 designate the object to the parent process 502. Functions of the child process 504 are granted access to data in the data storage 524 using a "this" pointer, that is defined by C++ standard. When a function inside a class definition is referenced, the compiler automatically generates program code that creates the "this" pointer that is passed to the module 500. The "this" pointer grants the child process 504 access to the object and thus to the persistent data. The persistent data areas are accessed by multiple independent modules to share without conflict.

Module independence is advantageously achieved using the virtual table technique for communication between modules since modules no longer must be linked. The usage of independent modules is highly advantageous for many reasons. One advantage is that multiple modules may be developed simultaneously with design and development tasks distributed among multiple software engineers. Another advantage is that maintenance is reduced because changes to a module are isolated to that particular module and do not require updating of other modules in the software system 200. Furthermore, testing is simplified since each module may be tested independently of other modules in the system. The independence among modules also improves reliability by avoiding unexpected interactions between functions of different modules. In addition, the software system 200 is easily extensible since programs may be extended simply by adding new independent modules that implement desired functionality. Multiple independent modules may use a single function independently so that code reuse is advantageously promoted using the virtual table technique.

Figure 5B:
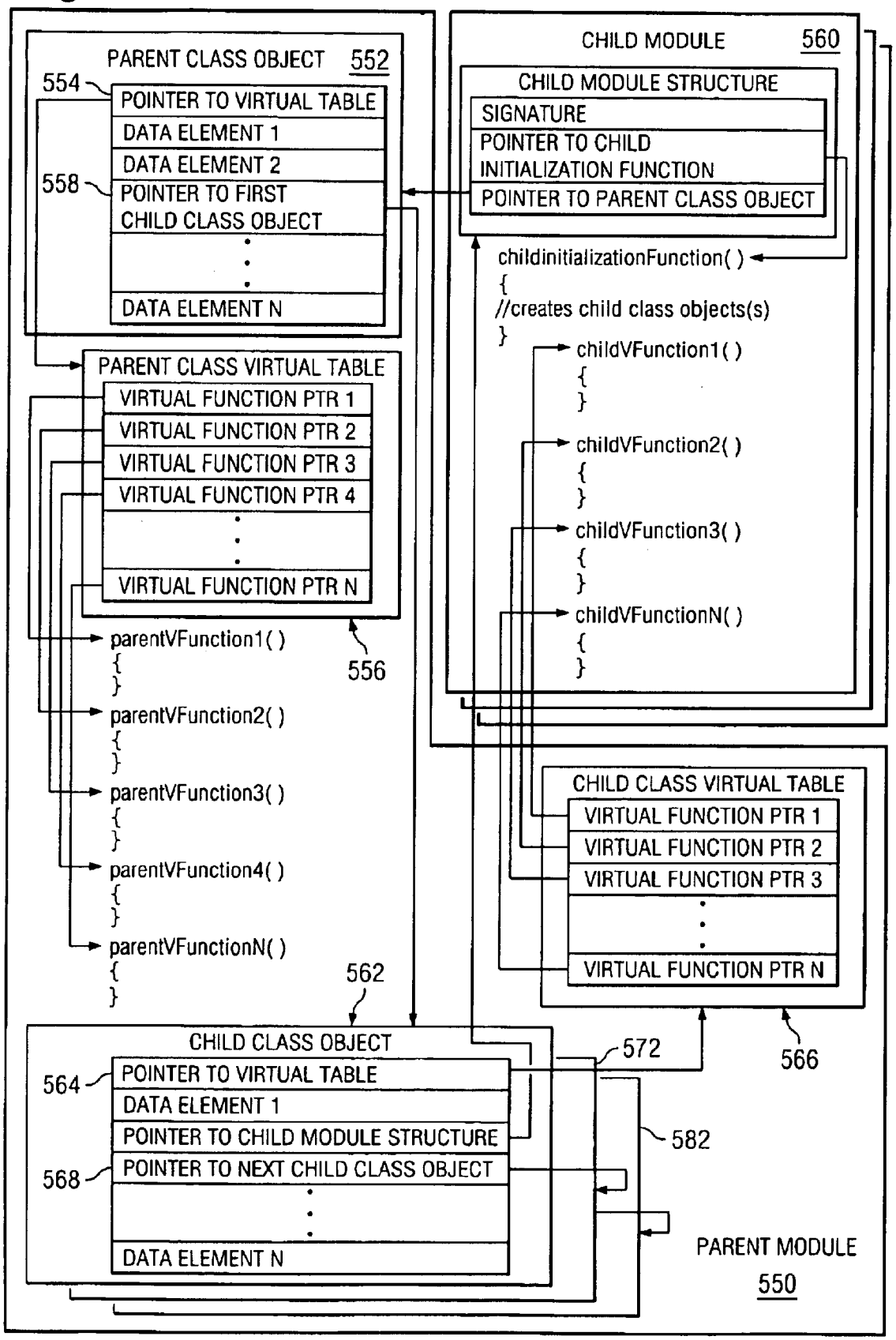

Referring to FIG. 5B, a class hierarchy diagram illustrates the interactions of parent module 550 and a child module 560. The parent module 550 includes a parent class object 552 and a plurality of child class objects 562, 572 and 582. The parent class object 552 has a pointer 554 to a parent class virtual table 556 and a pointer 558 to the child class object 562. The child class object 562 has a pointer 564 to a child class virtual table 566, a pointer to the child module 560 and a pointer 568 to the child class object 562. Each subsequent child class object 572 and 582 has a pointer (not shown) to an associated child class virtual table (not shown), a pointer to an associated child module and a pointer (not shown) to a subsequent child class object. The subsequent child class objects 572 and 582 may include a pointer to the child module 560 or a pointer to another child module (not shown). The childclass virtual table 566 includes a plurality of pointers to functions in the child module 560. The child module 560 has pointer to the parent class object 552.

Figure 6:
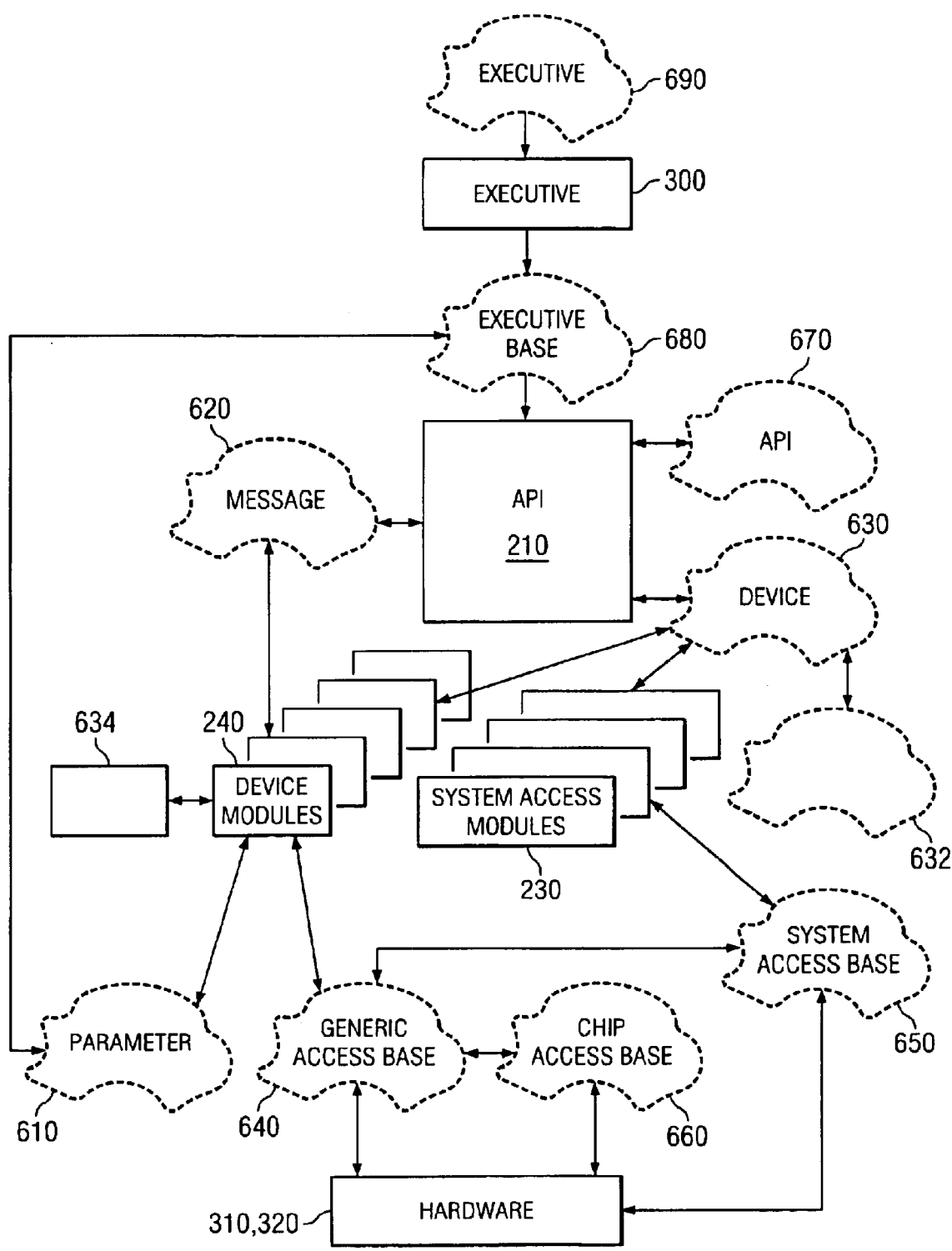
FIG. 6 is a class diagram which illustrates existing classes and the relationships of the classes in the logical design of the software system.

Referring to FIG. 6, a class diagram illustrates existing classes and the relationships of the classes in the logical design of the software system 200. The classes that are generated for usage by the software system 200 include a parameter class 610, a message class 620, a device class 630, a generic access base class 640, a system access base class 650, a chip access base class 660, an API class 670, an executive base class 680, an executive class 690 and a test class (not shown).

Referring to the class diagram shown in FIG. 6 in conjunction with procedures performed in accordance with the flow chart shown in FIG. 4, the parameter class 610 is described as a base class from which parameter classes are derived. The parameter classes are used by the device modules 330 to define user-modifiable parameters. After a device module 330 has been detected by the API constructor in step 412 and the API 210 has instantiated a device class in step 426, the device module 330 instantiates one parameter class 610 for each changeable parameter. The parameter classes 610 are subsequently attached to the device class 630 during instantiation of the parameter class 610 by the constructor. The executive 300 uses the parameter classes 610 to prompt a user to change parameters.

The message class 620 furnishes an interface between device modules 330 or system modules 340 into routines in the API 210.

The device class 630 is an abstract class, a class having no instances. Various modules instantiate a class derived from the abstract device class for every device that is detected. A constructor for the device class inserts a new instance of the device class into a sorted linked list of devices. The device list is sorted in ascending order according to a "device type" member of the list. Because the device class is an abstract class, a constructor of the device class derives a new class. The new classes are type specific and usually contain elements such as device-specific configuration information.

The generic access base class 640 is an abstract class that is a base class for generic access classes. The generic access classes are used by the device modules 330 to access computer hardware in a generic manner. In one embodiment of the software system 200, the general access base classes 640 either access "AT compatible" hardware directly or call the system access base classes 650 to access specific, non-AT compatible hardware such as cache/memory controllers, ECP parallel ports, CPUs and the like.

The system access base class 650 is an abstract class that is one of the base classes for system access classes. The system access classes are access classes that are used by the "generic" device access classes to access system-specific or chip-specific functions. A system module instantiates the system access classes at load time.

The chip access base class 660 is an abstract class that is one of the base classes for system access classes. The system access classes are access classes that are used by the "generic" device access classes to access system-specific or chip-specific functions. A system module instantiates the system access classes at load time.

The API class 670 controls maintenance functions for the software system 200. The maintenance functions include finding and loading of device modules, controlling memory allocations, and performing cleanup of device modules. Maintenance functions also include task switching between the executive and device modules and unloading of device modules. The API class 670 is instantiated only by an executive base constructor.

The executive base class 680 is an abstract class that furnishes an interface between the executive program 300 and the modules. Only one instance of a class derived from the executive base class 680 is allowed. A constructor of the executive class sequences through, finds and loads the module files that match a file mask which designates member files of the software system 200, calling a module initialization function for each module as the module is loaded. Once the constructor has complete operation, a sorted linked list of all devices found by all of the modules is left in memory for access using the executive class.

The executive class 690 is derived from the executive base class 680 and furnishes member functions including display progress, display message, display prompt, display status, display error, and display configuration functions. These functions are called by device modules 330 via the executive base class 680. A constructor for the executive class 690 does no more than merely call the constructor for the executive base class 690. Only one instance of the executive class 690 may exist at one time, a rule that is enforced by the constructor for the executive base class 680. Once an instance of the executive class 690 is removed using a delete operator, another instance may be created.

While the invention has been described with reference to various embodiments, it will be understood that these embodiments are illustrative and that the scope of the invention is not limited to them. Many variations, modifications, additions and improvements of the embodiments described are possible.

What is claimed is:

1. A method of communicating among independent software modules comprising:
   loading a parent process;
   generating, via a generating operation of the parent process, a child process;
   creating, via a creating operation of the parent process, a first object that describes a first function that is accessed by the child process, the first object forming a communication path between the parent process and the child process;
   loading, via a loading operation of the parent process, the child process into a storage;
   passing a first pointer designating the first object from the parent process to the child process;

creating, via a creating operation of the child process, a second object that describes a second function that is accessed by the parent process, the second object completing the communication path between the parent process and the child process; and passing, via a call function, a second pointer designating the second object from the child process to the parent process.

2. A method according to claim 1, further comprising:

creating a virtual table associated to the parent process and listing a plurality of pointers, including the first pointer, which are accessed by the parent process and accessed by the child process; and creating a virtual table associated to the child process and listing a plurality of pointers, including the second pointer, which are accessed by the parent process and accessed by the child process.

3. A method according to claim 2, further comprising:

creating, via the child process, a third object; and selectively unloading the child process from the storage while retaining the second object created by the child process and the virtual table associated to the child process.

4. A method according to claim 3, further comprising:

selectively reloading the child process into the memory storage in the same location as initially loaded by the parent process.

5. A method according to claim 3, wherein:

the third object created via the child process is an object used for data storage.

6. A method according to claim 1, wherein:

the parent process and the child process are independently linked so that no binary code for the child process is linked into the parent process and no binary code for the parent process is linked into the child process.

7. A method according to claim 1, further comprising the steps of:

selectively unloading the child process from the storage; and selectively reloading the child process into the storage in the same location as initially loaded by the parent process.

8. A method according to claim 1, wherein the parent process and the child process are defined within an object-oriented environment.

9. A computer system having a storage, the computer system comprising:

a parent process including:
  a constructor function for creating processes, objects and pointers;
  a loader function for loading processes and objects from the storage; and
  an unloader function for unloading processes and objects from the storage;

a child process created and loaded into storage by the parent process and including a constructor function for creating objects and pointers; and a virtual function interface including:
  a first object created by the parent process and describing a function that is accessed by the child process, the first object forming a communication path between the parent process and the child process;
  a first pointer created by the parent process and passed by the parent process to the child process, the first pointer designating the first object to the child process;
  a second object created by the child process and designating a second function that is accessed by the parent process, the second object completing the communication path between the parent process and the child process; and
  a second pointer created by the child process and designating the second object, the second pointer being passed from the child process to the parent process.

10. A computer system according to claim 9, wherein the virtual function interface further comprises:

a virtual table a plurality of pointers in a linked list, the linked list of pointers being accessed by the parent process of the parent class and accessed by the child process of the child class, one virtual table being created for a class, all objects of the class sharing the same virtual table so that the compiler establishes only a single additional pointer between an additional object and the virtual table.

11. A computer system according to claim 9, wherein:

the parent process and the child process are independently linked so that no binary code for the child process is linked into the parent process and no binary code for the parent process is linked into the child process.

12. A computer system according to claim 9, wherein the parent process and the child process are defined within an object-oriented environment.

13. A computer system having a storage and comprising:

one or more interface modules;

one or more system modules;

one or more device modules;

an application programming interface (API) coupled to the one or more interface modules, the one or more system modules and the one or more device modules, the API having a parent process including:
  a constructor function for creating processes, objects and pointers;
  a loader function for loading processes and objects from the storage; and
  an unloader function for unloading processes and objects from the storage; and a module of the interface, system and device modules having a child process created and loaded into storage by the parent process and including a constructor function for creating objects and pointers;

the API and the module forming a virtual function interface including:
  a first object created by the parent process and describing a function that is accessed by the child process, the first object forming a communication path between the parent process and the child process;
  a first pointer created by the parent process and passed by the parent process to the child process, the first pointer designating the first object to the child process;
  a second object created by the child process and designating a second function that is accessed by the parent process, the second object completing the communication path between the parent process and the child process; and
  a second pointer created by the child process and designating the second object, the second pointer being passed from the child process to the parent process.

14. A computer system according to claim 13, wherein the virtual function interface further comprises:

a virtual table including a plurality of pointers in a linked list, the linked list of pointers being accessed by the parent process of the parent class and accessed by the child process of the child class, one virtual table being created for a class, all objects of the class sharing the same virtual table so that the compiler establishes only a single additional pointer between an additional object and the virtual table.

15. A computer system according to claim 13 wherein the child process further includes:

a third object created by and associated to the child process; and a virtual table associated to the child process and including a plurality of pointers in a linked list, the linked list of pointers being accessed by the parent process and accessed by the child process.

16. A computer system according to claim 15 wherein:

the parent process unloader function selectively unloads the child process from the storage while retaining the third object created by the child process and the virtual table associated to the child process; and the parent process loader function reloads a module from a plurality of independent modules of the interface, system and device modules.

17. A computer system according to claim 13, wherein:

the parent process of the API and the child process of a module are independently linked so that no binary code for the child process is linked into the parent process and no binary code for the parent process is linked into the child process.

18. A computer system according to claim 13, wherein:

the one or more system modules are permanently loaded into the storage in the computer system.

19. A computer system according to claim 13, wherein:

the one or more device modules are loadable and unloadable into the storage in the computer system.

20. A computer system according to claim 13, wherein the parent process and the child process are defined within an object-oriented environment.

21. A computer usable medium having computable readable code embodied therein including a communication system operating on a processor and having a storage, the communication system including a routine for performing the method of communicating among independent software modules according to claim 1.

22. A computer usable signal having computable readable code embodied therein including a communication system operating on a processor and having a storage, the communication system including a routine for performing the method of communicating among independent software modules according to claim 1.

23. A computer usable medium having computable readable code embodied therein including a communication system operating on a processor and having a storage, the communication system including the computer system according to claim 9.

24. A computer usable signal having computable readable code embodied therein including a communication system operating on a processor and having a storage, the communication system including the computer system according to claim 9.

25. A computer usable medium having computable readable code embodied therein including a communication system operating on a processor and having a storage, the communication system including the computer system according to claim 14.

26. A computer usable signal having computable readable code embodied therein including a communication system operating on a processor and having a storage, the communication system including the computer system according to claim 14.

* * * * *